United States Patent [19]

Sato et al.

[11] Patent Number: 4,750,083

[45] Date of Patent: Jun. 7, 1988

[54] ELECTRICAL INSULATING OIL COMPOSITION

[75] Inventors: Atsushi Sato, Tokyo; Shigenobu Kawakami, Ichikawa; Keiji Endo, Yokosuka; Hideyuki Dohi, Yokohama, all of Japan

[73] Assignee: Nippon Petrochemicals Company, Ltd., Japan

[21] Appl. No.: 93,794

[22] Filed: Sep. 4, 1987

[30] Foreign Application Priority Data

Sep. 4, 1986 [JP] Japan ................. 61-208543

[51] Int. Cl.$^4$ .................. H01G 4/22; H01B 3/22
[52] U.S. Cl. .................. 361/315; 252/570; 361/327; 585/6.3; 585/25
[58] Field of Search ........... 252/570; 361/315, 327; 585/6.3

[56] References Cited

U.S. PATENT DOCUMENTS

| | | | |
|---|---|---|---|
| 4,054,937 | 10/1977 | Mandelcorn et al. | 361/315 |
| 4,266,264 | 5/1981 | Mandelcorn et al. | 361/315 |
| 4,506,107 | 3/1985 | Sato et al. | 252/570 |

FOREIGN PATENT DOCUMENTS

| | | | |
|---|---|---|---|
| 80045 | 8/1974 | Japan | 585/6.3 |
| 109856 | 10/1974 | Japan | 585/6.3 |
| 86700 | 7/1975 | Japan | 252/570 |

*Primary Examiner*—Robert Wax
*Attorney, Agent, or Firm*—Scully, Scott, Murphy & Presser

[57] ABSTRACT

An electrical insulating oil composition which is excellent in low temperature characteristics and suitable for use in impregnating capacitors, and comprises (a) m-ethylbiphenyl, (b) p-ethylbiphenyl, (c) m-isopropylbiphenyl and (d) p-isopropylbiphenyl, and is characterized in that the total amount of the ethylbiphenyls is not less than 40% by weight and the proportion of solid phase in the composition at a temperature of $-40°$ C. is not more than 45% by weight, the solid quantity of each component being calculated according to the following equation of solid-liquid equilibrium:

$$X_i = \exp\left[\frac{\Delta H_i^f}{R}\left(\frac{1}{T_i^f} - \frac{1}{T}\right)\right]$$

wherein $X_i$ is the equilibrium mole fraction of a component i in the liquid phase of the composition, $\Delta H_i^f$ is the heat of fushion (cal.mol$^{-1}$) of the component i, $T_i^f$ is the melting point (K) of the component i, T is the temperature (K) of the system, and R is the gas constant (cal.mol$^{-1}$.K$^{-1}$).

6 Claims, No Drawings

ELECTRICAL INSULATING OIL COMPOSITION

BACKGROUND OF THE INVENTION

1. Field of the Invention

This invention relates to a novel electrical insulating oil composition. More particularly, the invention relates to an electrical insulating oil composition which comprises compounds having biphenyl skeletons and is characterized in that the composition is excellent in low temperature characteristics and suitable for use in impregnating capacitors.

2. Description of the Prior Art

The compounds having biphenyl skeletons such as isopropylbiphenyl have been widely used as electrical insulating oils, especially those for capacitors.

There are three position isomers of o-isomer, m-isomer, and p-isomer in isopropylbiphenyls. The p-isomer is liable to separate out as crystals, so that it is proposed in U.S. Pat. No. 4,266,264 to increase the content of m-isomer. According to this proposal, the separating out of p-isomer is suppressed and, in this sense, the low temperature characteristic can be surely improved.

The isopropylbiphenyls are widely used as described above, however, the viscosity of them at low temperatures is high and the hydrogen gas absorbing capacity is not always good.

The evaluation of capacitors and the electrical insulating oils for impregnating them is done by testing partial discharge phenomenon. It is considered that the mechanism of the occurrence of this partial discharge correlates to hydrogen gas absorbing capacity. That is, hydrogen gas is generated prior to the occurrence of partial discharge. The hydrogen gas generated in the relevant portion is locally saturated in due course to produce bubbles of hydrogen gas and then the partial discharge occurs. In this procedure, when the quantity of hydrogen gas generation exceeds the capacity of the absorption or diffusion of hydrogen gas, bubbles are produced and finally the partial discharge is caused to occur as described above. Accordingly, in order to increase the quantity of absorption or diffusion, it is required of electrical insulating oils that hydrogen gas absorbing capacity is large and the diffusion of hydrogen gas is good enough.

The hydrogen gas absorbing property itself relates to the molecular structures of insulating oils. The absorption and diffusion of hydrogen gas relates to the viscosity of liquid rather than molecular structures. That is, if an electrical insulating oil is of high viscosity, mass transfer is inhibited and, as a result, the absorption and diffusion of hydrogen gas are suppressed.

The isopropylbiphenyls are characterized in that the viscosity seriously increases a low temperatures. For example, it is said that the isomer mixture of isopropylbiphenyls containing much m-isomer difficultly causes the separating out of crystals, however, its viscosities are 4.6 cSt at 40° C., 1500 cSt at −40° C. and as high as 12,000 cSt at −50° C. The absorption and diffusion of locally generated hydrogen gas are retarded seriously under such high viscosity conditions, therefore, the hydrogen gas is locally saturated to produce bubbles and finally vital dielectric breakdown is brought about.

Therefore, in view of only the viscosity, it cannot always be said that the isopropylbiphenyls are good in low temperature characteristic.

Accordingly, it is eagerly desired to propose an electrical insulating oil which has low viscosity at low temperatures and is excellent in hydrogen gas absorbing capacity.

BRIEF SUMMARY OF THE INVENTION

It is, therefore, the object of the present invention to provide a novel electrical insulating oil composition which is excellent in low temperature characteristics.

Another object of the present invention is to provide a novel electrical insulating oil composition which is suitable for use in impregnating oil-filled capacitors.

A further object of the present invention is to provide a novel electrical insulating oil composition which can be easily produced and used in the practical industries.

In view of the above objects, the present invention proposes an electrical insulating oil composition which comprises (a) m-ethylbiphenyl, (b) p-ethylbiphenyl, (c) m-isopropylbiphenyl and (d) p-isopropylbiphenyl, and is characterized in that the total amount of the ethylbiphenyls is not less than 40% by weight and the proportion of solid phase in the composition at a temperature of −40° C. is not more than 45% by weight, the solid quantity of each component being calculated according to the following general equation of solid-liquid equilibrium:

$$X_i = \exp\left[\frac{\Delta H_i^f}{R}\left(\frac{1}{T_i^f} - \frac{1}{T}\right)\right]$$

wherein $X_i$ is the equilibrium mole fraction of a component i in the liquid phase of the composition,
$\Delta H_i^f$ is the heat of fusion (cal.mol$^{-1}$) of the component i as a pure substance,
$T_i^f$ is the melting point (K) of the component i as a pure substance,
T is the temperature (K) of the system, and
R is the gas constant (cal.mol$^{-1}$.K$^{-1}$).

DETAILED DESCRIPTION OF THE INVENTION

The present invention will be described in more detail.

In the following, we will discuss in connection with the compounds in which the basic skeleton is biphenyl. The melting point of biphenyl itself having the lowest molecular weight among them is 69.1° C. With regard to methylbiphenyls having one more carbon atom than biphenyl, the melting point of p-isomer is +51.5° C.; m-isomer, +6° C.; and o-isomer, −0.2 C. Even though they cannot be used singly, it may be possible to use them as a mixture. However, there is a problem in practical use because the flash points of them are too low due to their low molecular weight. Furthermore, there are 12 kinds of isomers in dimethylbiphenyls having further one more carbon atom. Economical preparation method for dimethylbiphenyls is the methylation of biphenyl. In this method, however, methyl groups are introduced into symmetrical positions due to the orientation in the reaction. For example, dimethylbiphenyls are obtained in a mixture of 2,2'-dimethylbiphenyl (melting point: +20° C.), 3,3'-dimethylbiphenyl (melting point: +9° C.) and 4,4'-dimethylbiphenyl (melting point: +122.5° C.). Accordingly, it cannot be avoided that the isomer of high melting point is mixed in the product according to said methylation. Therefore, when economy is taken into account, the dimethylbiphenyls are not desirable. In ethylbiphenyls having the same molecular weight as that of dimethylbiphenyl, there are p-isomer of 35.5° C. in melting point, m-isomer of −27.6° C. and o-isomer of −6.1° C. Even though the melting point of p-isomer is high, they are not so high as compared with the dimethylbiphenyls, as a whole.

The only inexpensive method for preparing the ethylbiphenyls in industrial scale is to alkylate biphenyl with ethylene through Friedel-Crafts reaction. In the alkylation, however, o-isomer is not produced substantially. The same may be said of the preparation method with transalkylation.

Accordingly, the m-isomer and p-isomer of ethylbiphenyl can be produced inexpensively, and even though they cannot be used singly, there is possibility to obtain an excellent electrical insulating oil by mixing them as a composition.

The values of viscosity and hydrogen gas absorbing capacity of ethylbiphenyls and isopropylbiphenyls are shown in the following Table 1.

The used mixtures are prepared by alkylating biphenyl with ethylene or propylene in the presence of aluminum chloride catalyst. In any of the obtained isomer mixtures, o-isomer is scarcely contained.

TABLE 1

| Composition | m- and p-Isomer Mixture of Ethylbiphenyl | m- and p-Isomer Mixture of Isopropylbiphenyl |
|---|---|---|
| Content of m-Isomer (wt %) | 62.8 | 63.6 |
| Viscosity −40° C. (cSt) | 160 | 1,500 |
| Viscosity −50° C. (cSt) | 500 | 12,000 |
| Rate of Hydrogen(*) Gas Absorption (μl/min) | 175 | 156 |

(*): According to ASTM D2300

It is understood from the above table that, in comparison with the isopropylbiphenyl, the viscosity of ethylbiphenyl at low temperatures is excellent. The hydrogen gas absorbing capacity of ethylbiphenyl is also higher by about 10%.

Accordingly, ethylbiphenyl has quite excellent low temperature characteristic, however, the eutectic point of the two-component mixture of m-isomer and p-isomer of ethylbiphenyl is −36° C. In other words, even when ethylbiphenyls were mixed, they cannot exist in liquid at low temperatures of −40° C. or −50° C., so that it is apparent that they cannot function as an insulating oil at such low temperatures.

In the present invention, therefore, a composition of ethylbiphenyls and isopropylbiphenyls is prepared and the low temperature characteristics are improved by the effect of the depression of melting point (freezing point) among the components. When the compounds of biphenyl skeleton which have molecular weights higher than that of isopropylbiphenyl is mixed to ethylbiphenyls, the viscosity at low temperatures is too high owing to their high molecular weight. In addition, the hydrogen gas absorbing capacity shows a tendency to become low.

In the present invention, the position isomers of m-isomer and p-isomer are selected as the isopropylbiphenyls. The industrial method for inexpensively preparing isopropylbiphenyls are the alkylation of biphenyl. As shown in the foregoing Table 1, the o-isomer is scarcely produced like the case of the preparation of ethylbiphenyls. Accordingly, the m-isomer and p-isomer can be selected as inexpensively obtainable isopropylbiphenyls.

The electrical insulating oil composition of the present invention comprises 4 components of m-ethylbiphenyl, p-ethylbiphenyl, m-isopropylbiphenyl and p-isopropylbiphenyl. It is advantageous that any of these biphenyls can be prepared industrially at low cost.

The electrical insulating oil composition of the present invention has a low viscosity because it contains ethylbiphenyls, however, due to this fact, crystals are liable to separate out at low temperatures of −40° C. or −50° C. That is, the effect to suppress the formation of crystals by reducing the mobility of molecules by high viscosity cannot be expected. However, the range of composition of 4 components in which crystals are not separated out at all, that is, no solid phase exists or solid phase scarcely exists in the low temperature of −40° C. or −50° C., is very narrow. If such the composition is aimed, the insulating oil composition lacks its practical advantage because of limited selection of its composition.

In order to discuss the relation between the existence of solid phase and the partial discharge with developing the problem, the following assumption is made. The beginning of crystallizing out occurs at many irregular points and crystals gradually grow. When the crystals happen to cover relatively weak portions such as the peripheries of electrode and defective portions of solid insulating material in which electric potential is concentrated, the function of the insulating oil is hindered to cause the occurrence of partial discharge by the application of low electric voltage. With such the assumption, the relation between the lowering of partial discharge voltage owing to the crystallizing out and the quantity of crystals depends upon the probability of the existence of crystals in the relatively weak portions and defective portions. Accordingly, if a small amount of crystals are separated out, the partial discharge can occur even though its probability is small. Therefore, it will be accepted that the composition in which the possibility of solid phase to exist at low temperatures is high, is not desirable as an electrical insulating oil for low temperature use.

The inventors of the present application prepared foil-wound type capacitors using only polypropylene film as a dielectric material and they were impregnated with the mixture of ethylbiphenyls and isopropylbiphenyls. The capacitors were then subjected to repeated electrical loads at low temperatures to measure the voltages of partial discharge, thereby observing the behavior of partial discharge. At the same time, the proportions of solid phase at low temperatures were calculated according to the foregoing solid-liquid equilibrium equation. Thus, the relation between the behavior of partial discharge and the quantities of solid phase were investigated in detail.

In connection with a multi-component system in which liquids are mutually compatible but solids are incompatible; the eutectic point, the composition at equilibrium, and the quantity of solid phase (amount of crystals) can be calculated according to the foregoing solid-liquid equilibrium equation, which is accepted in physical chemistry. The solid-liquid equilibrium equation as a general equation includes an activity coefficient, however, in the present invention, the calculation can be done with assuming that the activity coefficient equals to 1 to obtain results which are well coincident with experimental values. Accordingly, the activity coefficient is assumed as 1 hereinafter. Exemplary calculation on a simple two-component system is described in "Solution and Phase Equilibrium", Chapter 6, Physical Chemistry, Walter J. Moore, 2nd ed., published by Prentice-Hall.

The exemplary calculation on solid phase will be described briefly. Assuming that a liquid insulating oil consists of Substance A and Substance B. The eutectic point of this two-component system can be obtained by solving two simultaneous equations of the foregoing solid-liquid equilibrium equation in Substance A and another equation in Substance B.

When the temperature of a system is below the above obtained eutectic point, all the components of this composition are solidified, so that the proportion of solid phase is 100%.

When the temperature of a system is above the eutectic point, the temperature of the system is substituted for the temperature of the solid-liquid equilibrium equation to obtain the respective mole fractions $X_A$ and $X_B$. They are then compared with the mole fractions $X_A{}^1$ and $X_B{}^1$ for 100% liquid, respectively. If the value of $X_A{}^1-X_A$ is positive, the amount of substance A corresponding to this value separates out as solid. In connection with B, the amount to be separated out can be calculated likewise. The sum of these values is the quantity of solid phase in the system. Incidentally, because the quantities of the respective substances that are separated out can be known, the composition of the relevant liquid phase can be calculated by inverse operation.

In order to calculate according to the foregoing solid-liquid equilibrium equation, the melting point and the heat of fusion of each component as a pure substance in the composition are necessary. In the following, the melting points and heats of fusion of ethylbiphenyl and isopropylbiphenyl are shown.

TABLE 2

| Compound | Melting Point (°C.) | Heat of Fusion (cal/mol) |
|---|---|---|
| m-Ethylbiphenyl | −27.6 | 4,000 |
| p-Ethylbiphenyl | +35.5 | 2,810(*) |
| p-Isopropylbiphenyl | +17(*) | 3,940(*) |

(*): Actually measured value

Seed crystals of biphenyl were put into the m-isopropylbiphenyl and it was cooled for one week in the temperature cycle of −40° C. to −50° C., however, no crystals were separated out. That is, the melting point of m-isopropylbiphenyl is considered to be below −40° C. Therefore, at least in the calculation using the solid-liquid equilibrium equation in the present invention, the m-isopropylbiphenyl can be assumed to be non-crystalline, i.e., always liquid. Therefore, the quantities of solid phase will be calculated hereinafter assuming that the m-isopropylbiphenyl is always liquid.

The proportion (% by weight) of solid phase in the composition and the state of partial discharge are summarized as follows:

The behavior of partial discharge at low temperatures of −40° C. and −50° C. of the capacitors which are impregnated with the mixture of ethylbiphenyls and isopropylbiphenyls is classified into the following three conditions (a) to (c).

(a) The partial discharge starts at a potential gradient of 20 to 50 V/μ in charged voltage, in addition, dielectric breakdown is sometimes caused to occur during measurement.

(b) The partial discharge starts at a relatively high potential gradient of 40 to 100 V/μ. In the plurality of measurement on each capacitor, the deviation of obtained values is large and no reproducibility is found.

(c) The starting voltages of partial discharge are on high levels even when solid phase exists, which levels are almost equal to those when the insulating oils are all liquid phase without any solid phase. In addition, the reproducibility of obtained values is good likewise. Accordingly, capacitors can have functions just like the conditions in which they are impregnated with all liquid phase.

When the data with regard to capacitors were arranged according to this classification, it was found out that there is a correlation between the states of partial discharge at low temperatures of −40° C. and −50° C. and the quantities of solid phase calculated by the solid-liquid equilibrium equation at these temperatures.

That is, in the mixtures of ethylbiphenyls and isopropylbiphenyls, the state of partial discharge of capacitors is in the above condition (b) when the quantity of solid phase exceeds 45 wt % but the system is not all solid, and measured starting voltages of partial discharge are quite worse in reproducibility. In the case that the quantity of solid phase is not more than 45% by weight but the system is not all liquid, however, it was confirmed that the above condition (c) was applied rather than the condition (b), that is, the state of partial discharge was like that of the system of substantially all liquid. Incidentally, for confirmation purpose, the partial discharge of capacitors was observed by cooling them to temperatures below −50° C. into the state of 100% solid phase, in which the state of partial discharge was in the above condition (a).

As described above, the finding that capacitors can function sufficiently even when the solid phase exists up to 45 wt %, apparently contradicts the foregoing supposition that the dielectric breakdown of capacitors is related to the separating out of crystals under probability. However, this may be solved as follows:

When the quantity of solid phase exceeds 45 wt % in the electrical insulating oil of an impregnated capacitor, the volume of solid phase becomes larger than the volume of liquid phase. The liquid phase is thus isolated or dispersed to form the so-called dispersion phase, or even when it is the so-called continuous phase, it is an insufficient continuous phase in which it is connected through minute spaces among many a crystal. Therefore, in view of mass transfer, such a state is regarded as a substantially dispersed phase. In such a case, when hydrogen gas and other gases are generated as a preliminary phenomenon of partial discharge, the produced gases cannot be diffused and absorbed sufficiently. If the partial discharge of capacitors is measured when th impregnated electrical insulating oil of the capacitors is in a state like this, the partial discharge is started by low electrical loads from the points in which the sufficient transfer of gas is inhibited. Furthermore, in microscopic view, the forms and volumes of the respective substantially isolated portions of the liquid phase are considered to be uneven, so that when the points which are liable to generate gases overlap the points in which the diffusion and absorption of gases difficultly occur in view of mass transfer, the partial discharge can be initiated by a very lower electric voltage. As a result, the starting voltages of partial discharge is worse in reproducibility like the foregoing condition (b).

On the other hand, if the calculated quantity of solid phase is 45 wt % or less, the proportion of the volume of solid phase is further smaller by the difference between the specific gravities of the solid phase and the liquid phase. As a result, it is considered that the liquid phase exists substantially as a continuous phase.

The above-mentioned mass transfer of generated gases relates to the factors of the gas diffusion in the liquid and the transfer of the liquid containing the gas itself. Anyway, it is desirable that the viscosity is low for the mass transfer. In the present invention, the viscosities of ethylbiphenyls themselves are low. Therefore, the viscosity of the composition is relatively low. Accordingly, the present invention is advantageous in view of mass transfer for the absorption and diffusion of hydrogen gas and it is considered that the composition functions like the state of substantially all liquid phase even when the solid phase exists as much as approximately 45% by weight.

Furthermore, when a small amount of solid is incidentally separated and they are directly deposited on the end portions of electrode, it is considered that there occurs no significant problem.

In other words, it is known that the power loss of capacitors can be reduced by eliminating pointed portions, for example, by making the end portions of electrode round. From this fact, it is understood that electric potential is concentrated to the pointed or deformed portions of electrodes and heat is generated by the consumption of electric power. Accordingly, when an electrode is outwardly deformed, heat is generated in the deformed portion and the crystals in contact with at least the deformed electrode are fused into liquid. Thus the electrode is substantially covered by liquid phase and therefore, there is no problem in view of the partial discharge.

The electrical insulating oil composition of the present invention comprises a mixture of 4 components of m- and p-ethylbiphenyls and m- and p-isopropylbiphenyls. This composition can be prepared by selecting the 4 components in a manner that the proportion of solid phase in the composition calculated according to the foregoing solidliquid equilibrium equation is not more than 45% by weight at the temperature of the system of $-40°$ C., preferably $-50°$ C.

However, the quantity of ethylbiphenyls in the composition is desirably not less than 40% by weight in the present invention. The reason is that the ethylbiphenyls are superior in hydrogen gas absorbing capacity as compared with the isopropylbiphenyls. In the case that the total quantity of ethylbiphenyls is less than 40% by weight, the hydrogen gas absorbing capacity of the composition of the present invention is accordingly worse.

When the electrical insulating oil composition according to the present invention is used, other known electrical insulating oils and oil additives can be added at arbitrary ratios within the object of the present invention. Exemplified as such electrical insulating oil is diisopropylnaphthalene.

The capacitors that are suitable for the impregnation with the electrical insulating oil composition of the present invention are the so-called foil-wound capacitors. The capacitors of this kind are made by winding metal foil such as aluminum foil as an electrode together with a plastic film as a dielectric or an insulating material in layers to obtain capacitor elements, which are then impregnated with an electrical insulating oil. Though insulating paper can be used together with the plastic film, the use of plastic film only is preferable. As the plastic film, polyolefin film such as biaxially oriented polypropylene film is desirable. The impregnation of the electrical insulating oil composition into the capacitor elements can be done according to the conventional method.

In summary, as described above, the composition of the present invention is excellent in hydrogen gas absorbing capacity because 40% by weight or more of ethylbiphenyls which have good hydrogen gas absorbing capacity is contained.

At the same time, because the viscosities of ethylbiphenyls at low temperatures are low, the viscosity at low temperatures of the composition containing the same is also low. As a result, in cooperation with the improvement in the hydrogen gas absorbing capacity, the low temperature characteristics at $-40°$ C. or $-50°$ C. of the composition according to the present invention are excellent.

In the composition of the present invention, by mixing the 4 components, a low melting point can be attained by the depression of melting point (freezing point) among the components.

Furthermore, when the quantity of solid phase is not more than 45% by weight at low temperatures of $-40°$ C. or $50-°$ C., the capacitors impregnated with the composition of the present invention show the behavior of partial discharge just like the capacitors impregnated with an all liquid composition. In other words, because the separating out of crystals up to 45% by weight can be allowed, the ranges of proportions of the respective 4 components to be selected can be enlarged. This fact produces practical advantage together with the fact that the biphenyls in the present invention can be industrially produced at low cost.

In the following, the present invention will be described in more detail with reference to example.

EXAMPLE

The capacitors used in the experiment were as follows:

As the solid insulating material, a simultaneously stretched biaxially oriented polypropylene film of impregnation type that was made by Shin-etsu Film Co., Ltd. through tubular method, was used.

Two sheets of the film of $14\mu$ thick (micrometer method) was wound together with an electrode of aluminum foil to make capacitor elements of 0.3 to 0.4 $\mu$F in electrostatic capacity, which were put in a tin can. The can was a flexible one so as to compensate the shrinkage of an insulating oil at low temperatures. The end portion of the electrode was not folded and left in the state as slit.

As the method to connect the electrode to a terminal, it is commonly done that a ribbon-like lead foil is inserted to the face of electrode in the capacitor element. With this method, the contact between the lead foil and the electrode becomes worse when crystals separate out and partial discharge occurs on the electrode, which makes the measurement impossible. In this experiment, therefore, the electrode was wound with its end protruded from the film and the protruded portions were connected together to the lead foil by spot-welding.

The thus prepared can-type capacitors were subjected to vacuum drying in an ordinary manner, and under the same vacuum condition, it was impregnated with an insulating oil, which was followed by sealing. It was then subjected to heat treatment at a maximum temperature of 80° C. for 2 days and nights in order to make the impregnation uniform and stabilized. After leaving it to stand at room temperature for 5 days, AC 1400 V (corres. to 50 V/μ) was applied to the capacitor for 16 hours in a thermostat at 30° C. and it was used for experiment.

The electrical insulating oils used for the impregnation were prepared by mixing at predetermined ratios of the ethylbiphenyl mixture and the isopropylbiphenyl mixture in the foregoing Table 1.

The impregnated capacitors were cooled for 1 week with temperature cycles to maintain them at the measuring temperature in the daytime and at a temperature lower by 10° C. than the measuring temperature in the nighttime. After that the capacitors were left to stand for 24 hours at the measuring temperature and used for the measurement.

A power supplier having a mechanism (zero cross start) which is started when alternating voltage becomes 0 after switched on, was used.

The charge of voltage was started at a value which was higher by 20 V/μ than the above presumed partial discharge initiating voltage (PDIV) by using the conventional measuring method of the so-called ramp test. The time length to start partial discharge (hereinafter referred to as "PDST") was measured with maintaining the voltage constant. The detection of discharge and measurement of time were done by a data processing device of a precision of 0.02 second that was installed with a micro-processor. The voltage was then lowered by 5 V/μ to measure PDST. After that, the voltage was lowered by 5 V/μ step by step until the measured time exceeded 1 second. "The voltage by which partial discharge occurs after 1 second" was obtained by interpolation, which value is hereinafter referred to as "PDIV 1 sec value".

As is clearly understood from the following description, the test results using PDIV 1 sec value were very reproducible as a measurement method.

With regard to each insulating oil, 5 capacitors were made and the measurement was done 5 times for each capacitor to obtain 25 resultant values.

The minimum and the maximum of PDIV 1 sec values at measuring temperatures of −40° C. and −50° C. are shown in Table 3.

The total quantities of solid phase calculated according to the foregoing solid-liquid equilibrium equation are also shown in Table 3.

The following facts will be understood in view of the results in Table 3.

In the relation between the proportions of solid phase and the minimum and maximum of PDIV 1 sec values, in the case that the calculated proportion of solid phase is 45 wt % or less, the width between the minimum and maximum of PDIV 1 sec values hardly varies even when the solid phase exists. That is, the behavior is the same as that of liquid phase even when the solid phase exists. This corresponds to the foregoing condition (c). If the proportion of solid phase exceeds 45 wt %, the width between the minimum and maximum becomes large and the reproducibility is worsened seriously (Experiment Nos. 2 and 5, at −50° C., respectively). This corresponds to the foregoing condition (b). Even though the reproducibility is made better in the 100% solid phase, the PDIV 1 sec values themselves are very low (Experiment No. 1, at −40° C. and −50° C., respectively). This is the foregoing condition (a).

In view of the PDIV 1 sec values themselves and the proportions of components, when the proportion of solid phase is not more than 45 wt %, the PDIV 1 sec values themselves having such a proportion are lowered with the lowering of the content of ethylbiphenyl, even though the reproducibility of PDIV 1 sec values is not changed. In the case of ethylbiphenyl only, the PDIV 1 sec values are lowered considerably (Example No. 1). Meanwhile, in the case of isopropylbiphenyl only, even when it is a mixture of three isomers, the PDIV 1 sec value at −50° C. is very low (Experiment No. 6, at −50° C.).

It is understood from the above facts that, in order to attain both the high PDIV 1 sec values and the good reproducibility, a composition must be made by mixing ethylbiphenyls and isopropylbiphenyls and the proportion of solid phase must be not more that 45% by weight.

TABLE 3

| Experiment No. | | 1 | 2 | 3 | 4 | 5 | 6 |
|---|---|---|---|---|---|---|---|
| Ethylbiphenyl /MIPB | | 100/0 | 80/20 | 60/40 | 40/60 | 20/80 | 0/100 |
| PDIV 1 sec Value | | | | | | | |
| Max/Min | −40° C. | 42/28 | 86/75 | 82/70 | 73/65 | 68/59 | 72/61 |
| V/μ | −50° C. | 35/23 | 68/43 | 73/64 | 66/59 | 63/51 | 59/50 |
| Viscosity of Liquid Phase | | | | | | | |
| cSt | −40° C. | — | 280 | 430 | 690 | 1,100 | 2,300 |
| (Measured) | −50° C. | — | 1,700 | 1,800 | 2,600 | 3,400 | 13,800 |
| Proportion of Solid Phase | | | | | | | |
| wt % | −40° C. | 100 | 9.6 | 0.3 | 3.2 | 12.3 | 21.7 |
| (Calc.) | −50° C. | 100 | 53.1 | 9.6 | 9.9 | 47.1 | 27.0 |

What is claimed is:

1. An electrical insulating oil composition which comprises (a) m-ethylbiphenyl, (b) p-ethylbiphenyl, (c) m-isopropylbiphenyl and (d) p-isopropylbiphenyl, and is characterized in that the total amount of said ethylbiphenyls is not less than 40% by weight and the proportion of solid phase in said composition at a temperature of −40° C. is not more than 45% by weight, the solid quantity of each component being calculated according to the following general equation of solid-liquid equilibrium:

$$X_i = \exp\left[\frac{\Delta H_i^f}{R}\left(\frac{1}{T_i^f} - \frac{1}{T}\right)\right]$$

wherein
  $X_i$ is the equilibrium mole fraction of a component i in the liquid phase of said composition,
  $\Delta H_i^f$ is the heat of fusion (cal.mol$^{-1}$) of said component i as a pure substance,
  $T_i^f$ is the melting point (K) of said component i as a pure substance,
  T is the temperature (K) of the system, and
  R is the gas constant (cal.mol$^{-1}$.K$^{-1}$).

2. The electrical insulating oil composition as claimed in claim 1, wherein said temperature of the system is −50° C.

3. An oil-filled electrical capacitor which is impregnated with the electrical insulating oil composition according to claim 1.

4. The electrical capacitor according to claim 3, wherein said capacitor has a rolled plastic film.

5. The electrical capacitor according to claim 4, wherein said plastic film is a polyolefin film.

6. The electrical capacitor according to claim 5, wherein said polyolefin film is a polypropylene film.

* * * * *

UNITED STATES PATENT AND TRADEMARK OFFICE
CERTIFICATE OF CORRECTION

PATENT NO. : 4,750,083

DATED : June 7, 1988

INVENTOR(S) : Atsushi Sato, et al.

It is certified that error appears in the above-identified patent and that said Letters Patent is hereby corrected as shown below:

Column 1, line 54: "a" should read as --at--

Column 6, lint 57: "th" should read as --the--

Column 10, Table 3: [table image] should read as: [table image]

Signed and Sealed this

Thirtieth Day of May, 1989

Attest:

DONALD J. QUIGG

Attesting Officer

Commissioner of Patents and Trademarks